(12) United States Patent
Rabb

(10) Patent No.: US 10,353,427 B1
(45) Date of Patent: Jul. 16, 2019

(54) CARRYING CASE FOR A LAPTOP COMPUTER

(71) Applicant: William Rabb, Pensacola, FL (US)

(72) Inventor: William Rabb, Pensacola, FL (US)

(*) Notice: Subject to any disclaimer, the term of this patent is extended or adjusted under 35 U.S.C. 154(b) by 153 days.

(21) Appl. No.: 15/582,706

(22) Filed: Apr. 30, 2017

(51) Int. Cl.
*G06F 1/16* (2006.01)
*A45C 7/00* (2006.01)
*A45C 11/00* (2006.01)

(52) U.S. Cl.
CPC .......... *G06F 1/1628* (2013.01); *A45C 7/0022* (2013.01); *G06F 1/1632* (2013.01); *A45C 7/0054* (2013.01); *A45C 2011/002* (2013.01)

(58) Field of Classification Search
CPC ... G06F 1/1628; G06F 1/1632; A45C 7/0022; A45C 7/0054; A45C 2011/002–2003; A45C 2007/004; A45C 9/00; A45C 7/0095
USPC ............... 207/748, 305, 320, 749, 745, 747; 220/23.6, 826; 190/21; 206/320, 305; 361/679.55
See application file for complete search history.

(56) References Cited

U.S. PATENT DOCUMENTS

| | | | | |
|---|---|---|---|---|
| 249,092 A | * | 11/1881 | Protzen ................ | A45C 7/0022 190/103 |
| 294,938 A | * | 3/1884 | Traver ................... | B65D 25/04 217/8 |
| 2,718,447 A | * | 9/1955 | Wright ................... | B44D 3/04 206/1.7 |
| 4,790,431 A | * | 12/1988 | Reel ...................... | G06F 1/1628 190/109 |
| 4,837,590 A | * | 6/1989 | Sprague ................ | B41J 3/36 190/1 |
| 4,896,776 A | | 1/1990 | Kabanuk et al. | |
| 4,998,616 A | * | 3/1991 | Hillinger .............. | A45C 7/0054 190/17 |
| 5,069,332 A | * | 12/1991 | Williams .............. | A45C 7/0054 206/495 |
| 5,105,338 A | | 4/1992 | Held | |
| 5,177,665 A | | 1/1993 | Frank et al. | |
| 5,214,574 A | * | 5/1993 | Chang ................... | G06F 1/1628 190/102 |
| 5,226,540 A | * | 7/1993 | Bradbury .............. | G06F 1/1628 206/320 |
| 5,242,056 A | * | 9/1993 | Zia ........................ | G06F 1/1628 190/110 |
| 5,271,501 A | * | 12/1993 | Chen ...................... | B25H 3/06 206/373 |
| 5,485,922 A | | 1/1996 | Butcher | |
| 5,488,572 A | | 1/1996 | Belmont | |
| 5,535,093 A | | 7/1996 | Noguchi et al. | |
| 5,555,489 A | * | 9/1996 | Keskinen .............. | G06F 1/1628 312/223.2 |

(Continued)

*Primary Examiner* — Chun Hoi Cheung
(74) *Attorney, Agent, or Firm* — Peter Loffler

(57) ABSTRACT

A laptop carrying case is a hard or semi-hard sided case with padding therein. A video monitor with adjustable stand is resident within the case and is connected to a laptop placed into the opened case. No external power cord or charger adapter is needed for the monitor. A mousepad with wrist rest is resident within the case. Appropriate voids within the padding hold the charging adapter and its cord and the mouse. A closable opening allows the cord to pass through the case and charge the laptop even if the case is closed. The carrying case may be made in a folding two-section or folding four-section configuration. Some configurations have a dividable work space within the case.

9 Claims, 6 Drawing Sheets

(56) References Cited

U.S. PATENT DOCUMENTS

| | | | |
|---|---|---|---|
| 5,576,929 A | 11/1996 | Uchiyama et al. | |
| 5,590,022 A * | 12/1996 | Harvey | G06F 1/1628 206/576 |
| 5,666,265 A * | 9/1997 | Lutz | G06F 1/1628 206/320 |
| 5,764,475 A * | 6/1998 | LeVander | G06F 1/1628 361/679.55 |
| 5,772,110 A * | 6/1998 | Garretson | B65D 5/009 206/749 |
| 5,966,285 A | 10/1999 | Sellers | |
| 5,996,749 A * | 12/1999 | Hillsberg | G06F 1/1628 190/109 |
| 6,067,078 A | 5/2000 | Hartman | |
| 6,134,105 A * | 10/2000 | Lueker | A45C 7/0054 206/320 |
| 6,331,936 B1 | 12/2001 | Hom et al. | |
| 6,362,954 B1 * | 3/2002 | Levander | G06F 1/1628 190/100 |
| 6,454,064 B1 | 9/2002 | Cheng | |
| 6,530,475 B1 * | 3/2003 | Penney | A45C 13/02 190/110 |
| 6,533,138 B2 * | 3/2003 | Chwen-Ru | B25H 3/023 206/373 |
| 7,366,925 B2 | 4/2008 | Keely et al. | |
| 7,628,271 B1 * | 12/2009 | Marton | G06F 1/1628 206/305 |
| 7,821,780 B2 | 10/2010 | Choy | |
| 7,929,281 B2 | 4/2011 | Szolyga et al. | |
| 8,203,832 B2 | 6/2012 | Szabolcsi et al. | |
| 8,662,269 B2 | 3/2014 | Shor et al. | |
| 8,724,301 B2 | 5/2014 | Mahmoud | |
| 8,763,795 B1 | 7/2014 | Oten et al. | |
| 9,038,820 B2 * | 5/2015 | Ashry | B65D 5/009 206/216 |
| 2003/0142469 A1 | 7/2003 | Ponx | |
| 2003/0183348 A1 * | 10/2003 | Carter | A45C 9/00 160/135 |
| 2004/0264126 A1 | 12/2004 | Wells | |

\* cited by examiner ized carrying case for laptop.

CARRYING CASE FOR A LAPTOP COMPUTER

BACKGROUND OF THE INVENTION

1. Field of the Invention

The present invention relates to a protective carrying case for a laptop computer wherein the case also functions as a workstation for the laptop and wherein an external video monitor is resident within the case and connectable to the laptop, allowing a user to operate the computer with two separate monitors.

2. Background of the Prior Art

While handheld mobile electronic devices such as tablets and smartphones are all the rage, the ubiquitous laptop is still a formidable player in the portable computing space. The laptop offers functionality that is not present on smaller handheld devices, such as relatively large storage, computation speed from coprocessors, various plug-in ports for external connectivity, relatively large video screen, etc. Modern work habits have, however, outpaced laptop design to a degree, and often demand even more viewing area, such as an additional monitor, which allows multiple computer windows and work areas.

Similar to its handheld brethren, the laptop is subject to the various hazards of a portable electronic device, including impact from other objects or falls and water damage from rain or spilled drinks, among others, any of which can subject the laptop to either costly repairs or premature death, possibly with the attendant loss of much data. Therefore, while traveling, laptop users seek to protect the laptop from the potential hazards that await the laptop. Some laptop owners simply put the laptop and its attendant accoutrements, such as the charger adapter and cord inside a travel bag, such as an overnight bag and hope that the bag itself, along with other items in the bag, including clothing, are ample protection for the laptop. While offering a degree of protection to the laptop, the computer is still subject to being bounced around and a large impact onto the bag or the bag's gravitation decent to the ground, such as falling from an overhead luggage bin, can easily damage or destroy the laptop.

Others remedy this with laptop-specific carrying cases that are padded and dimensioned to hold a laptop therein and have pockets for holding auxiliary elements used with the laptop. While such laptop targeted bags tend to offer better protection than an overnight bag, such bags do not protect the laptop from all hazards such as the aforementioned drop from high above.

Additionally, neither of the above-described carrying methods provides functionality beyond the protected transport of the laptop from location to location. Once a user arrives at a desired destination, the laptop and its auxiliary items are removed from the carrying bag, and the bag is stored until needed for the next transport.

What is needed is a device that helps transport a laptop from location to location in a safe and secure manner while offering additional functionality beyond the transport role. Such a device must allow the various auxiliary items, including an additional monitor, to be properly carried along with the laptop and must protect the various items from the common perils that befall portable computers, including bumps, falls, and water. Such device must be ergonomically friendly and must not otherwise be bulky or heavy so as not to unduly burden the laptop transporter.

SUMMARY OF THE INVENTION

The carrying case for a laptop computer of the present invention addresses the aforementioned needs in the art by providing a transport case specifically targeted at carrying a laptop computer along with its auxiliary items, including a charger adapter and its cord, a mouse and its pad, and even notes and other papers for quick and easy reference while using the laptop, as well as a built-in, easily connected second monitor. The carrying case for a laptop computer protects the laptop from being banged up via bumps from other objects, such as an arm rest on an aircraft, from falls, and from water, including spilled drinks or rain. The carrying case for a laptop computer opens up to function as a standalone work station for the laptop and includes a USB-connected monitor so that a user can use dual screens while working with the laptop. The carrying case for a laptop computer is relatively compact in size and relatively lightweight for the amount of protection offered so as not to unduly burden the transporter of the laptop. The carrying case for a laptop computer is of relatively simple design and construction, being produced using standard manufacturing techniques, so as to make the present invention relatively inexpensive to produce so that the device is economically attractive to potential consumers for this type of device. Use of the carrying case for a laptop computer is quick, logical, and straightforward.

The carrying case for a laptop computer of the present invention is comprised of a carrying case that is formed of a first section having a first outer shell with a first padded portion therein and a second section having a second outer shell with a second padded portion therein. The first section and the second section are hingedly secured together along a fold line for folding between an open position and a closed position wherein the first padded portion and the second padded portion are face to face and form an enclosure. A video monitor is disposed within a first void within the first padded portion and is secured to the first outer shell. The video monitor is connected via a cable to a laptop such that the laptop provides electrical power and data to the video monitor. A mousepad is attached to the second padded portion. A second void is disposed within the second padded portion. An opening is located within the second outer shell proximate the second void. Either a carrying handle or a carrying strap or both are attached to the carrying case. A divider is removably attached to an inner surface of the second outer shell so as to face the second padded portion. A third void is disposed within the second padded portion. A strut is attached to the first outer shell and to the second outer shell for holding the first section at a fixed angle with respect to the second section when the carrying case is in the open position. The first outer shell and the second outer shell are latched together when the carrying case is in the closed position. The mousepad may be fixedly attached to the second padded portion. Alternately, the carrying case for a laptop comprises a carrying case that is formed of a first section having a first outer shell with a first padded portion therein, a second section having a second outer shell rim with a second padded portion therein, a third section having a third outer shell rim with a third padded portion therein, and a fourth section having a fourth outer shell with a fourth padded portion therein. The first section and the second section hingedly secured together along a first fold line while the second section and the third section are hingedly secured together along a second fold line and the third section and the fourth section are hingedly secured together along a third fold line. The carrying case is folded between a closed position wherein the first section is folded atop the second section, the third section is folded underneath the second section, and the fourth section is folded underneath the third section, and an open position wherein the first section is unfolded from the second section, the third section is unfolded from the second section, and fourth section is unfolded from the third section so that the first fold line and the third fold line are located on a common longitudinal axis and the third fold line is oriented generally normal to longitudinal axis and between the first fold line and the third fold line. A video monitor is disposed within a first void within the fourth padded portion and secured to the first outer shell. The video monitor is connected via a cable to a laptop such that the laptop provides electrical power and data to the video monitor. A mousepad is attached to the third padded portion. A second void is disposed within the second padded portion. An opening is located within the second outer shell rim proximate the second void. A carrying handle is attached to the carrying case. A third void is disposed within the second padded portion or the third padded portion. A first strut is attached to the first outer shell and to the second outer shell rim for holding the first section at a fixed angle with respect to the second section when the carrying case is in the open position while a second strut is attached to the fourth outer shell and to the third outer shell rim for holding the fourth section at a fixed angle with respect to the third section when the carrying case is in the open position. A clip attaches the first section to the fourth section whenever the carrying case is in the open position. The first outer shell and the second outer shell rim are latched together when the carrying case is in the closed position. The first outer shell, the second outer shell rim, the third outer shell rim, and the fourth outer shell are all strapped to each other when the carrying case is in the closed position. The mousepad may be fixedly attached to the third padded portion.

BRIEF DESCRIPTION OF THE DRAWINGS

Similar reference numerals refer to similar parts throughout the several views of the drawings.

DESCRIPTION OF THE PREFERRED EMBODIMENT

Figure 1:
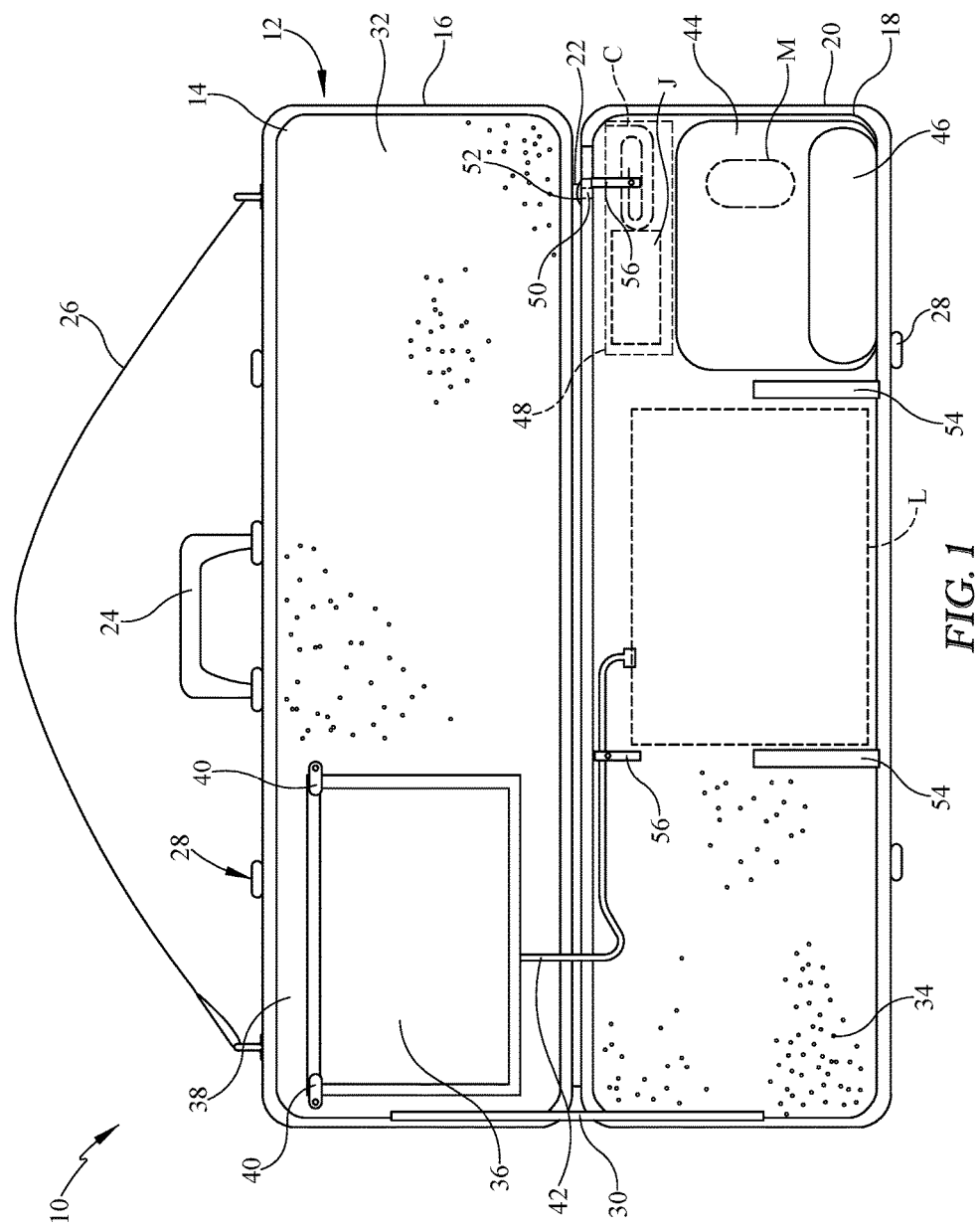
FIG. 1 is a plan view of the carrying case for a laptop computer of the present invention in an open state.

Referring now to the drawings, it is seen that the carrying case for a laptop computer of the present invention, generally denoted by reference numeral 10, is comprised of a foldout carrying case 12 that has a first section 14 with a first outer shell 16 and a second section 18 with a second outer shell 20, the two outer shells 16 and 20 are hingedly attached to one another in appropriate fashion such as the illustrated heavy fabric hinge 22 (typical hardware type hinges may also be used). The first outer shell 16 and the second outer shell 20 may be essentially rigid being made of material such as plastic, aluminum etc., or semi-rigid made of materials such as leather, heavy duty reinforced canvas, etc., in order to be durable and provide protection for the contents within the carrying case 12—if the first outer shell 16 and the second outer shell 20 of the carrying case 12 are semi-rigid, and a fabric- or metal-type hinge 22 is employed, the hinge 22 may be integral with the remainder of the first outer shell 16 and the second outer shell 20 so as to be in the form of a living hinge.

A carrying handle 24 is attached to the top of the carrying case 12, either to the first outer shell 16 or the second outer shell 20 as is a shoulder strap 26 which may be adjustable. An appropriate latching system 28, which may be lockable, is attached to the top of the carrying case 12 (male portion of the latching system 28 attached to one of the outer shells 16 or 20 and the corresponding female portion of the latching system attached to the other outer shell 20 or 16) in order to hold the carrying case 12 in a closed position whenever the first section 14 and the second section 18 are folded together. A strut 30 is attached to both the first section 14 and the second section 18 so that when the carrying case 12 is in an open position, with the second section 18 resting on a work surface, such as a desk or even a person's legs, the strut 30 holds first section 14 in place at an appropriate angle, which is typically slightly greater than ninety degrees with respect to the second section 18. The strut 30 is made from any appropriate material, such as the material used to form the outer shells 16 and 20 of the carrying case 12, metal, chain, etc.

As seen, the interior of the carrying case 12 is padded so that the first section 14 is lined with a first portion of padding 32 and the second section 18 is lined with a second portion of padding 34, the two sections of padding 32 and 34 being of an appropriate material, such as foam.

A video monitor 36 of appropriate design and size is removably held within a first void 38 within the first portion of padding 32. The video monitor 36 attached to an inner surface of the first outer shell 16 of the first section 14 of the carrying case 12 in appropriate fashion, possibly via an appropriate built-in stand (not illustrated) and is held in place within the first void 38 for transport via adjustable mounting chocks 40 or other appropriate device that hold the video monitor 36 to the inner surface of the first outer shell 16 of the first section 14. A data cable 42, which is also the power cable, extends from the video monitor 36 in order to connect the video monitor 36 to a computer L.

A mousepad 44 is removably attached to a section of the second portion of padding 34 in appropriate fashion. The mousepad 44 may have any appropriate surface such as fabric, plastic, glass, aluminum, high-tech fibers, etc., and may have a precision surface. A gel-type wrist rest 46 is located on the lower end of the mousepad 44.

A second void 48 is disposed within the second portion of padding 34 just above the mousepad 44. An opening 50 is provided in the second outer shell 20 of the second section 18 of the carrying case 12 and is closable via a cap 52.

One or more dividers 54 are snap-fit into one of a series of appropriate receivers (not illustrated) located on an inner surface of the second outer shell 20.

In order to use the carrying case for a laptop computer 10 of the present invention, the carrying case 12 is unfolded and a laptop computer L is placed onto a section of the second portion of padding 34. The video monitor 36 is connected to the laptop computer L via the data cable 42. An appropriate tab 56 is attached to the second outer shell 20 and holds the data cable 42 to the second outer shell 20. The dividers 54 are moved laterally as desired and locked in place within their respective receivers. A mouse M is placed onto the mousepad 44. The laptop computer L is now used as needed with the benefit of dual screens being provided via the laptop computer's screen and the video monitor 36. The mouse M is used on the mousepad 44 in order to control the laptop computer L in the usual way with the wrist rest 46 providing comfort to the user. The space within the second section beyond the laptop computer L to the left of the laptop computer L in FIG. 1, can be used to hold books, papers, etc. The charger adapter J and its cord C are held within the second void 48 within the second portion of padding 34. If the laptop computer L needs to be plugged in, the cord C can be run through the opening 50 located on the second outer shell 20 by removing the cap 52 from the opening 50. The cap 52 can be tethered to the second outer shell 20 in appropriate fashion.

When use of the laptop computer L is no longer needed, the laptop computer L is folded closed in appropriate fashion (with or without power down) and the video monitor 46 may, but need not be disconnected from the laptop computer L. If the laptop computer L is being charged and the cord C is passing through the opening 50 on the second outer shell 20, then the charging may continue uninterrupted. The carrying case 12 is closed by bringing the first section 14 and the second section 18 together and latching them to one another. The contents within the carrying case 12 are protected by both the outer shells of the carrying case 12 and the padding within the carrying case 12. If the carrying case 12 is to be moved, then the cord C is pulled back into the second void 48 and the opening 50 is closed via the cap 52. The carrying case 12 can now be carried via either than handle 24 or shoulder strap 26 as desired.

Figure 2:
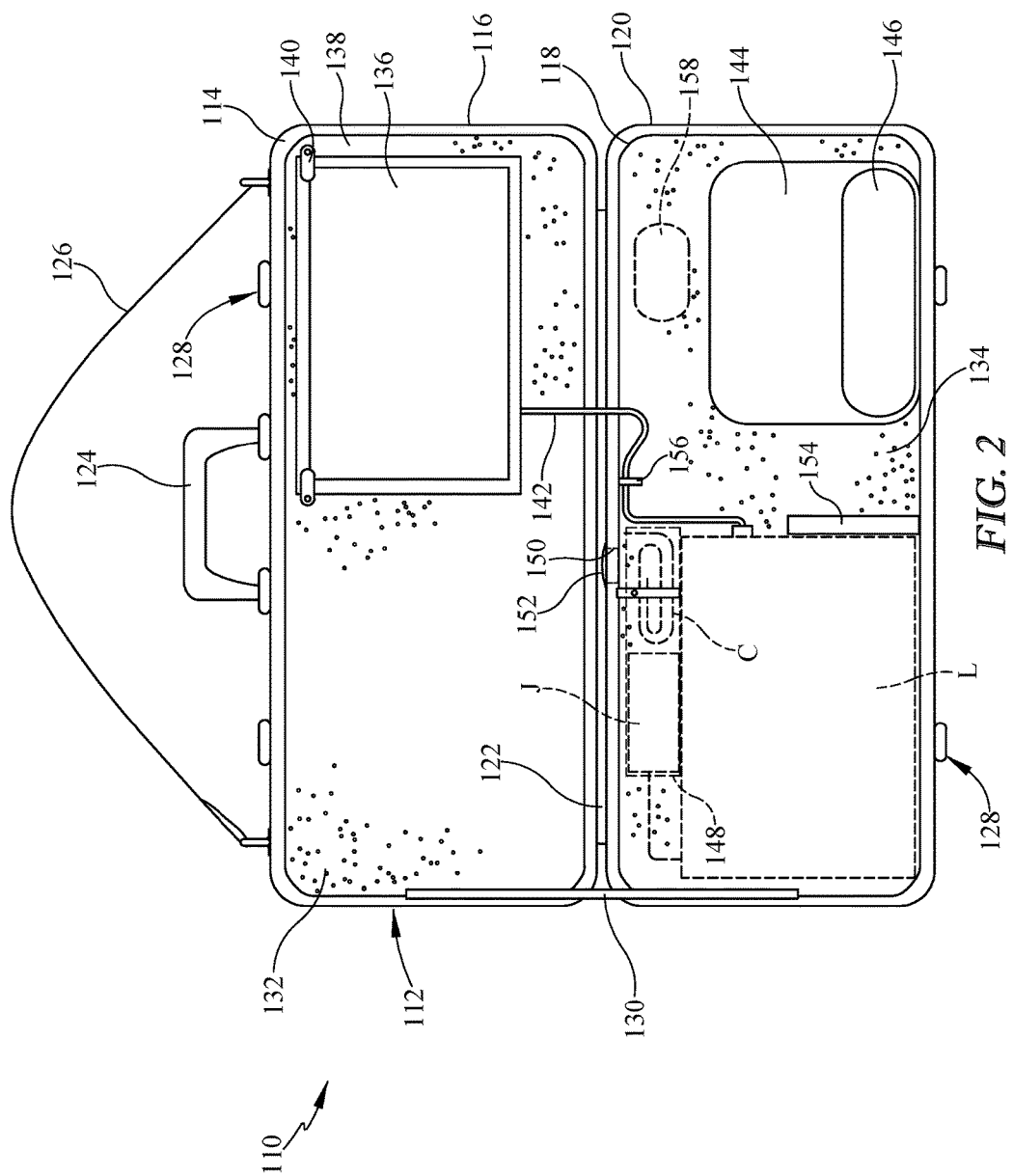
FIG. 2 is a plan view of the carrying case for a laptop computer in a smaller form.
Figure 3:
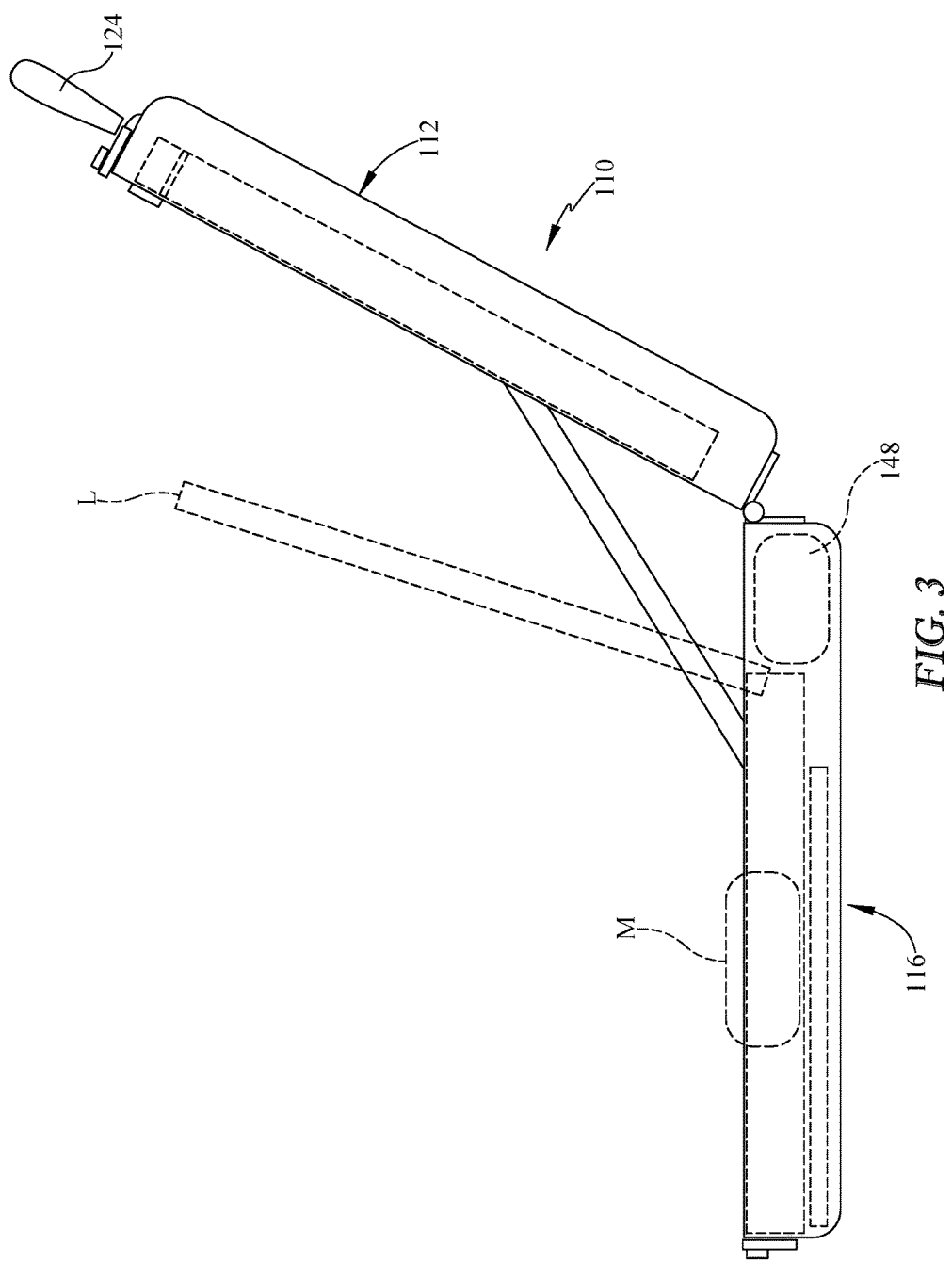
FIG. 3 is a side view of the carrying case for a laptop computer in an open state.

As seen in FIGS. 2 and 3 in a smaller version of the carrying case for a laptop computer of the present invention, generally denoted by reference numeral 110, the carrying case for a laptop computer 110 is comprised of a foldout carrying case 112 that has a first section 114 with a first outer shell 116 and a second section 118 with a second outer shell 120, the two outer shells 116 and 120 are hingedly attached to one another in appropriate fashion such as the illustrated heavy fabric hinge 122 (typical hardware type hinges may also be used). The first outer shell 116 and the second outer shell 120 may be essentially rigid being made of material such as plastic, aluminum etc., or semi-rigid made of materials such as leather, heavy-duty reinforced canvas, etc., in order to be durable and provide protection for the contents within the carrying case 112—if the first outer shell 116 and the second outer shell 120 of the carrying case 112 are semi-rigid, and a fabric type hinge 122 is employed, the hinge 122 may be integral with the remainder of the first outer shell 116 and the second outer shell 120 so as to be in the form of a living hinge.

A carrying handle 124 is attached to the top of the carrying case 112, either to the first outer shell 116 or the second outer shell 120 as is a shoulder strap 126 which may be adjustable. An appropriate latching system 128, which may be lockable, is attached to the top of the carrying case 112 (male portion of the latching system 128 attached to one of the outer shells 116 or 120 and the corresponding female portion of the latching system 128 attached to the other outer shell 120 or 116) in order to hold the carrying case 112 in a closed position whenever the first section 114 and the second section 118 are folded together. At least one strut 130 is attached to both the first section 114 and the second section 118 so that when the carrying case 112 is in an open position, with the second section 118 resting on a work surface, such as a desk or even a person's legs. the strut 130 holds first section 114 in place at an appropriate angle, which is typically slightly greater than ninety degrees with respect to the second section 118. The strut 130 is made from any appropriate material, such as the material used to form the outer shells 116 and 120 of the carrying case 112, metal, chain, etc.

As seen, the interior of the carrying case 112 is padded so that the first section 114 is lined with a first portion of padding 132 and the second section 118 is lined with a second portion of padding 134, the two portions of padding 132 and 134 being of an appropriate material, such as foam.

A video monitor 136 of appropriate design and size is removably held within a first void 138 within the first portion of padding 132. The video monitor 136 attached to an inner surface of the first outer shell 116 of the first section 114 of the carrying case 112 in appropriate fashion, possibly via an appropriate built-in stand (not illustrated) and is held in place within the first void 138 for transport via adjustable mounting chocks 140 that hold the video monitor 136 to the inner surface of the first outer shell 116 of the first section 114. A data cable 142 extends from the video monitor 136 in order to connect the video monitor 136 to a computer L.

A mousepad 144 is removably attached to a section of the second portion of padding 134 in appropriate fashion. The mousepad 144 may have any appropriate surface such as fabric, plastic, glass, aluminum, high-tech fibers, etc., and may have a precision surface. A gel-type wrist rest 146 is located on the lower end of the mousepad 144.

A second void 148 is disposed within the second portion of padding 134 just above the mousepad 144. An opening 150 is provided in the second outer shell 120 of the second section 118 of the carrying case 112 and is closable via a cap 152.

A divider 154 is snap-fit into one of a series of appropriate receivers (not illustrated) located on an inner surface of the second outer shell 120.

In order to use the carrying case for a laptop computer 110 of the present invention, the carrying case 112 is unfolded and a laptop computer L is placed onto a section of the second portion of padding 134. The video monitor 136 is connected to the laptop computer L via the data cable 142. An appropriate tab 156 is attached to the second outer shell 20 and holds the data cable 142 to the second outer shell 120. The divider 154 is moved laterally as desired and locked in place to its selected receiver. A mouse M is placed onto the mousepad 144. The laptop computer L is now used as needed with the benefit of dual screens being provided via the laptop computer's screen and the video monitor 136. The mouse M is used on the mousepad 144 in order to control the laptop computer L in the usual way with the wrist rest 146 providing comfort to the user. The charger adapter J and its cord C are held within the second void 148 within the second portion of padding 134. If the laptop computer L needs to be plugged in, the cord C can be run through the opening 150 located on the second outer shell 120 by removing the cap 152 from the opening 150. The cap 152 can be tethered to the second outer shell 20 in appropriate fashion.

When use of the laptop computer L is no longer needed, the laptop computer L is folded closed in appropriate fashion (with or without power down) and the video monitor 146 may, but need not be disconnected from the laptop computer L. If the laptop computer L is being charged and the cord C is passing through the opening 150 on the second outer shell 120, then the charging may continue uninterrupted. A third void 158 may be provided within a section of the second portion of padding 134 in order to store the mouse M. The carrying case 112 is closed by bringing the first section 114 and the second section 118 together and latching them to one another. The contents within the carrying case 112 are protected by both the outer shells of the carrying case 112 and the padding within the carrying case 112. If the carrying case 112 is to be moved, then the cord C is pulled back into the second void 48 and the opening 150 is closed via the cap 152. The carrying case 112 can now be carried via either than handle 124 or shoulder strap 126 as desired.

Figure 4:
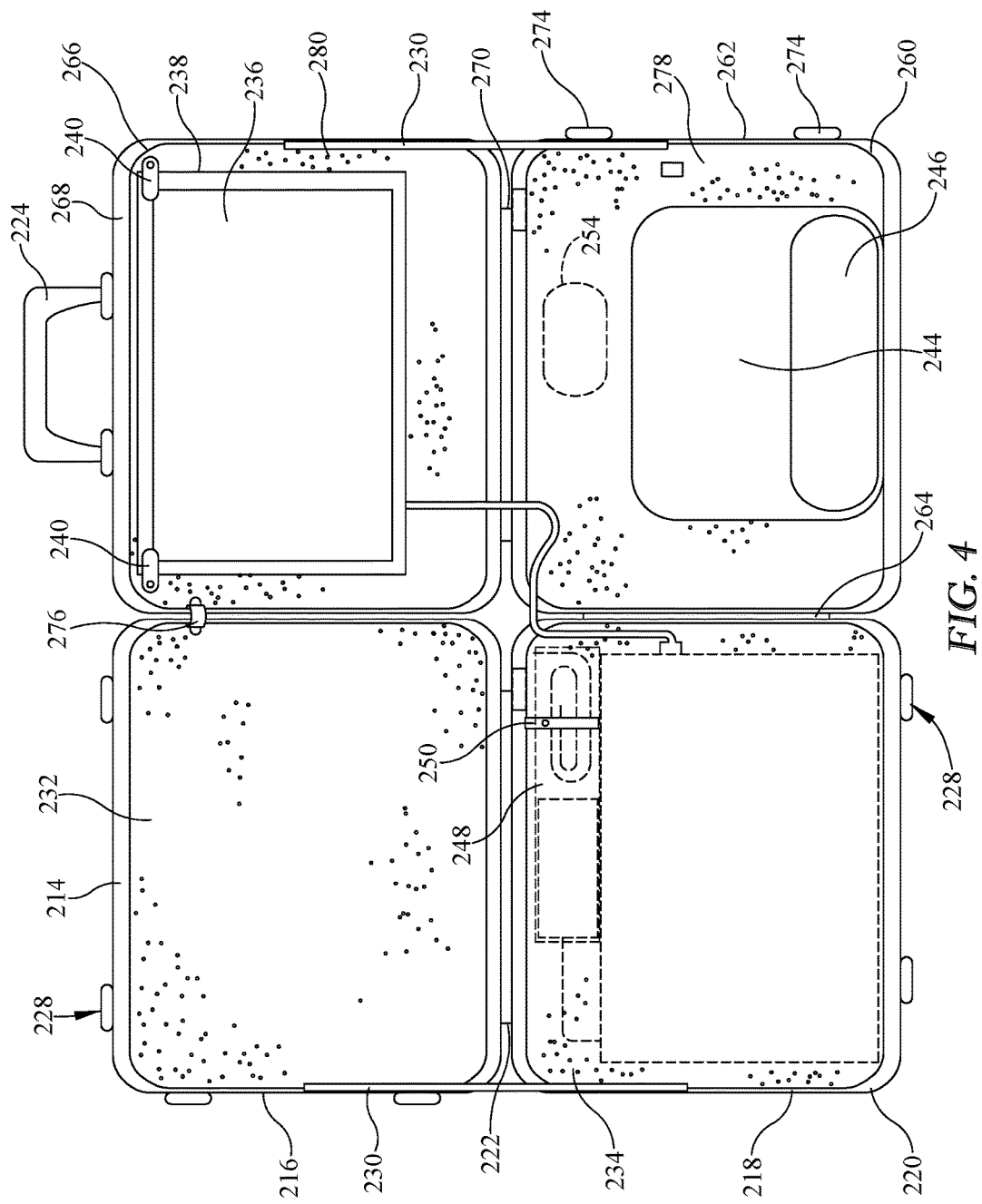
FIG. 4 is a plan view of an alternate embodiment of the carrying case for a laptop computer of the present invention in an open state.
Figure 5:
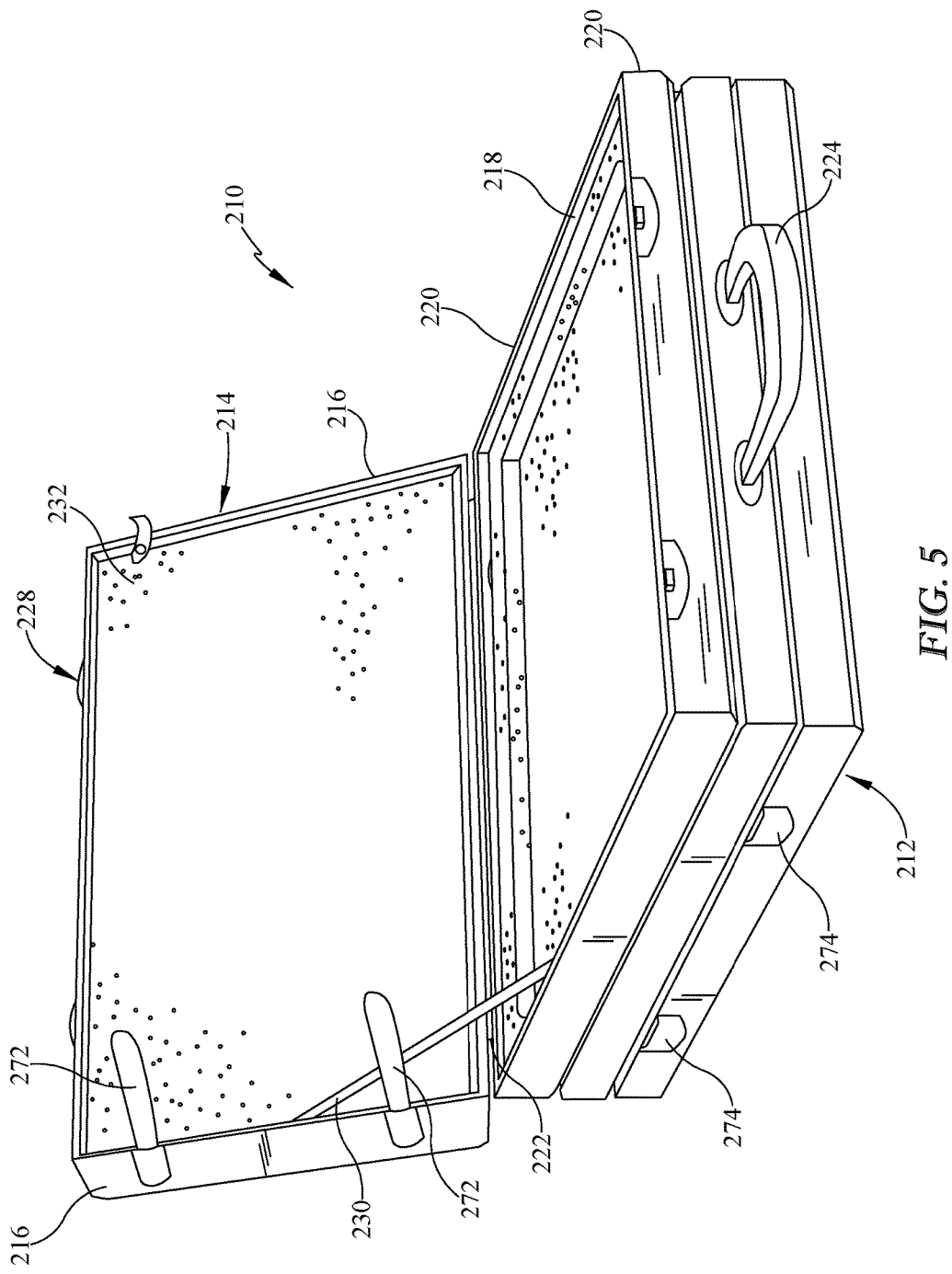
FIG. 5 is a perspective view of the carrying case for a laptop computer of FIG. 4 in a partially open state.
Figure 6:
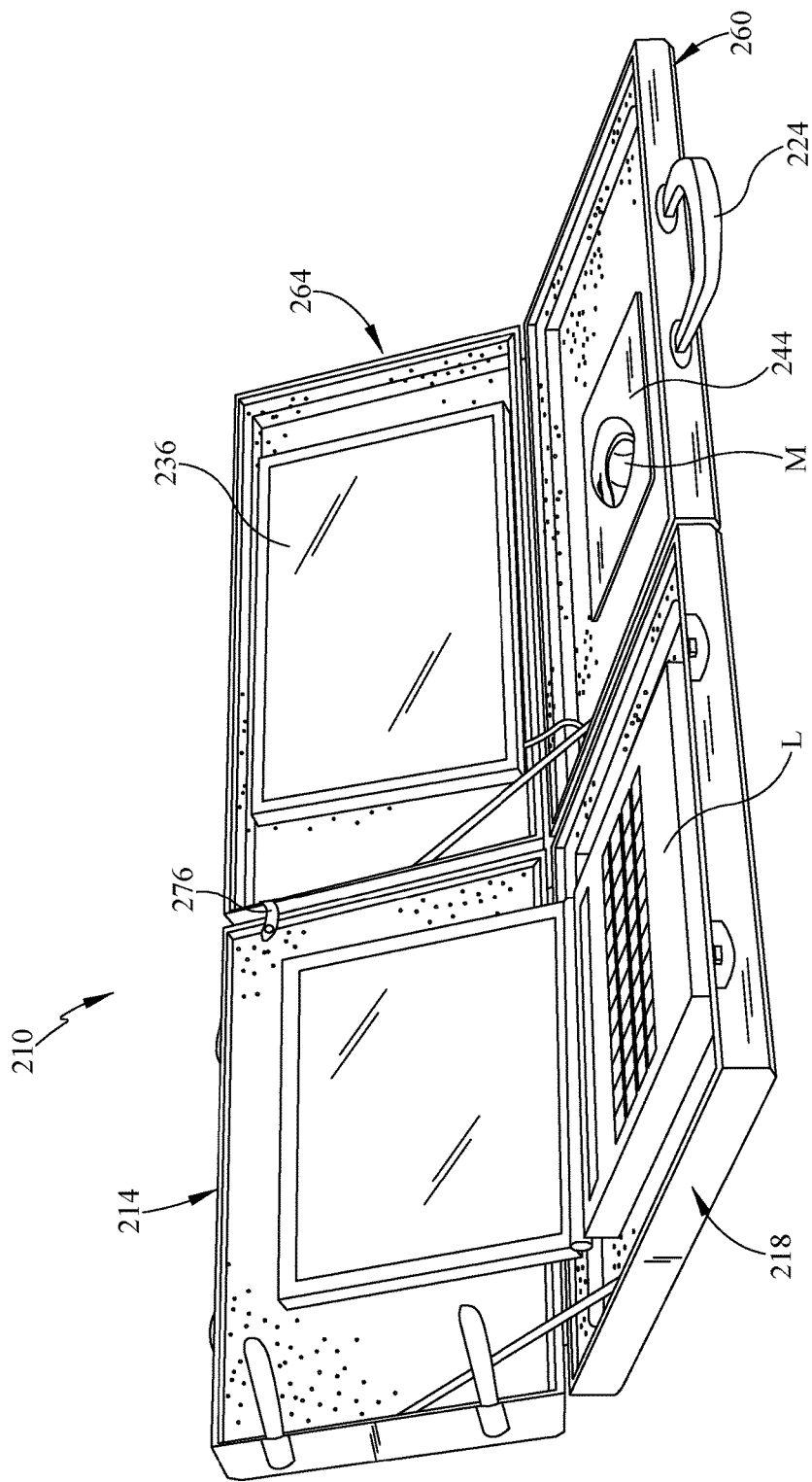
FIG. 6 is a perspective view of the carrying case for a laptop computer of FIG. 4 in an open state.

As seen in FIGS. 4-6 in an alternate embodiment of the carrying case for a laptop computer of the present invention, generally denoted by reference numeral 210, the carrying case for a laptop computer 210 is comprised of a multiple foldout carrying case 212 that has a first section 214 with a first outer shell 216 and a second section 218 with a second outer shell rim 220, the two outer shells 216 and 220 are hingedly attached to one another in appropriate fashion such as the illustrated heavy fabric first hinge 222 (typical hardware type hinges may also be used). A third section 260 has a third outer shell rim 262 and is hingedly attached to the second outer shell rim 220 of the second section 218 in appropriate fashion such as the illustrated heavy fabric second hinge 264 (typical hardware type hinges may also be used). A fourth section 266 has a fourth outer shell 268 and is hingedly attached to the third outer shell rim 262 of the third section 260 in appropriate fashion such as the illustrated heavy fabric third hinge 270 (typical hardware type hinges may also be used). The first outer shell 216, the second outer shell rim 220, the third outer shell rim 262, and the fourth outer shell 268 may be essentially rigid being made of material such as plastic, aluminum etc., or semi-rigid made of materials such as leather, heavy duty reinforced canvas, etc., in order to be durable and provide protection for the contents within the carrying case 212—if the first outer shell 216, the second outer shell rim 220, the third outer shell rim 262, and the fourth outer shell 268 of the carrying case 212 are semi-rigid, and fabric type hinges are employed, the first hinge 222, the second hinge 264, and the third hinge 270 may be integral with the remainder of their respective outer shells and outer shell rims in order for each hinge to form a living hinge. This multiple fold-up case allows for a more-compact device when closed, easier for carrying or stowing.

A carrying handle 224 is attached to the top of the carrying case 212, either to the second outer shell rim 220 or the third outer shell rim 262. An appropriate latching system 228, which may be lockable, is attached to the top of the carrying case 212 (male portion of the latching system 228 attached to either of the first outer shell 216 or the second outer shell rim 220 and the corresponding female portion of the latching system 228 attached to the other, either the second outer shell rim 220 or the first outer shell 216) in order to hold the first section 214 and the second section 218 of the carrying case 212 in a closed and possibly locked configuration whenever the first section 214 and the second section 218 are folded together. Additionally, a pair of straps 272 is attached to an outer surface of the first outer shell 216 and corresponding strap receivers 274 are located on an outer surface of the fourth outer shell 268 so that each strap 272 is passed through its respective receiver 274 whenever the carrying case for a laptop computer 210 is in the fully folded position, the straps 272 holding the case in such position. At least one strut 230 is attached to both the first section 214 and the second section 218 and another strut 230 is attached to the third section 260 and to the fourth section 266 so that when the carrying case 212 is in an open position, with the second section 218 and the third section 260 resting on a work surface, such as a desk or even a person's legs. The struts 230 holds first section 214 and the fourth section 266 in place at an appropriate angle, which is typically slightly greater than ninety degrees with respect to the second section 218 and third section 260. The struts 230 are made from any appropriate material, such as the material used to form the outer shells 216 and 268 and outer shell rims 218 and 262 of the carrying case 212, metal, chain, etc. A clip 276 is used to hold the first section 214 with the fourth section 266 when case is fully opened.

As seen, the interior of the carrying case 212 is padded so that the first section 214 is lined with a first portion of padding 232, the second section 218 is lined with a second portion of padding 234, the third section 260 is lined with a third portion of padding 278, and the fourth section 266 is lined with a fourth portion of padding 280, the four portions of padding 232, 234, 278, and 280 being of an appropriate material, such as foam.

A video monitor 236 of appropriate design and size is removably held within a first void 238 within the fourth portion of padding 280. The video monitor 236 attached to an inner surface of the fourth outer shell 268 of the fourth section 266 of the carrying case 212 in appropriate fashion, possibly via an appropriate built-in stand (not illustrated) and is held in place within the first void 238 for transport via adjustable mounting chocks 240 that hold the video monitor 236 to the inner surface of the fourth outer shell 268 of the fourth section 266. A data cable 242 extends from the video monitor 236 in order to connect the video monitor 236 to a computer L.

A mousepad 244 is removably attached to a section of the third portion of padding 278 in appropriate fashion. The mousepad 244 may have any appropriate surface such as fabric, plastic, glass, aluminum, high-tech fibers, etc., and may have a precision surface. A gel-type wrist rest 246 is located on the lower end of the mousepad 244.

A second void 248 is disposed within the second portion of padding 234. An opening 250 is provided in the second outer shell rim 220 of the second section 218 of the carrying case 212 and is closable via a cap 252.

In order to use the carrying case for a laptop computer 210 of the present invention, the carrying case 212 is unfolded so that all padded portions 232, 234, 278, and 280 face upwardly and a laptop computer L is placed onto a section of the second portion of padding 234. The video monitor 236 is connected to the laptop computer L via the data cable 242. An appropriate tab 256 is attached to the second outer shell rim 220 and holds the data cable 242 to the second outer shell rim 220. A mouse M is placed onto the mousepad 244. The laptop computer L is now used as needed with the benefit of dual screens being provided via the laptop computer's screen and the video monitor 236. The mouse M is used on the mousepad 244 in order to control the laptop computer L in the usual way with the wrist rest 246 providing comfort to the user. The charger adapter J and its cord C are held within the second void 248 within the second portion of padding 234. If the laptop computer L needs to be plugged in, the cord C can be run through the opening 250 located on the second outer shell rim 220 by removing the cap 152 from the opening 150. The cap 252 can be tethered to the second outer shell rim 220 in appropriate fashion.

When use of the laptop computer L is no longer needed, the laptop computer L is folded closed in appropriate fashion (with or without power down) and the video monitor 246 may, but need not be disconnected from the laptop computer L. If the laptop computer L is being charged and the cord C is passing through the opening 250 on the second outer shell rim 220, then the charging may continue uninterrupted. A third void 254 may be provided within a section of the third portion of padding 278 in order to store the mouse M. The carrying case 212 is closed by folding the fourth section 266 to the third section 260, folding those sections under the second section 218, and finally folding those three sections to the first section 214, latching first section 214 and the second section 218 together and passing the straps 272 through the strap receivers 274 and holding the straps in such position in appropriate fashion (straps 272 can be looped and buckled or hook and loop material held together, the strap receivers 274 may have holds therein, etc.,). The contents within the carrying case 212 are protected by the outer shells 216 and 268 and the outer shell rims 220 and 262 of the respective sections of the carrying case 212 and the padding within the carrying case 212. If the carrying case 212 is to be moved, then the cord C is pulled back into the second void 248 and the opening 250 is closed via the cap 252. The carrying case 212 can now be carried via the handle 224.

While the invention has been particularly shown and described with reference to embodiments thereof, it will be appreciated by those skilled in the art that various changes in form and detail may be made without departing from the spirit and scope of the invention.

I claim:

1. A carrying case system comprising:
a carrying case formed of a first section having a first outer shell with a first padded portion therein, a second section having a second outer shell rim with a second padded portion therein, a third section having a third outer shell rim with a third padded portion therein, and a fourth section having a fourth outer shell with a fourth padded portion therein, such that the first section and the second section hindgedly secured together along a first fold line, the second section and the third section are hindgedly secured together along a second fold line and the third section and the fourth section are hingedly secured together along a third fold line and such that the carrying case is folded between a closed position wherein the first section is folded atop the second section, the third section is folded underneath the second section, and the fourth section is folded underneath the third section, and an open position wherein the first section is unfolded from the second section, the third section is unfolded from the second section, and fourth section is unfolded from the third section so that the first fold line and the third fold line are located on a common longitudinal axis and the third fold line is oriented generally normal to longitudinal axis and between the first fold line and the third fold line;
a video monitor disposed within a first void within the fourth padded portion and secured to the fourth outer shell, the video monitor adapted to be connected via a cable to a laptop such that the laptop provides electrical power and data to the video monitor;
a mousepad attached to the third padded portion; and
a second void disposed within the second padded portion.

2. The carrying case system as in claim 1 further comprising an opening located within the second outer shell rim proximate the second void.

3. The carrying case system as in claim 1 further comprising a carrying handle attached to the carrying case.

4. The carrying case as in claim 1 further comprising a third void disposed within the second padded portion or the third padded portion.

5. The carrying case as in claim 1 further comprising:
a first strut attached to the first outer shell and to the second outer shell rim for holding the first section at a fixed angle with respect to the second section when the carrying case is in the open position; and
a second strut attached to the fourth outer shell and to the third outer shell rim for holding the fourth section at a fixed angle with respect to the third section when the carrying case is in the open position.

6. The carrying case as in claim 5 further comprising a clip attached to the first section and the fourth section whenever the carrying case is in the open position.

7. The carrying case as in claim 1 wherein the first outer shell and the second outer shell rim are latched together when the carrying case is in the closed position.

8. The carrying case as in claim 1 wherein the mousepad is fixedly attached to the third padded portion.

9. The carrying case as in claim 1 wherein the first outer shell, the second outer shell rim, the third outer shell rim, and the fourth outer shell are all strapped to each other when the carrying case is in the closed position.

* * * * *